United States Patent
Proctor, Jr.

(10) Patent No.: US 8,755,473 B2
(45) Date of Patent: Jun. 17, 2014

(54) METHOD AND APPARATUS FOR DETECTING RAPID CHANGES IN SIGNALING PATH ENVIRONMENT

(75) Inventor: James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 833 days.

(21) Appl. No.: 09/772,176

(22) Filed: Jan. 29, 2001

(65) Prior Publication Data

US 2002/0101943 A1    Aug. 1, 2002

(51) Int. Cl.
*H04L 1/00*    (2006.01)
*H04B 1/10*    (2006.01)

(52) U.S. Cl.
USPC .................................................. 375/346

(58) Field of Classification Search
USPC ......... 375/331, 340, 346, 354, 316, 147, 220, 375/262, 326, 344, 371; 370/320, 342, 335; 455/446, 562.1; 329/304
See application file for complete search history.

(56) References Cited

U.S. PATENT DOCUMENTS

| | | | |
|---|---|---|---|
| 5,128,873 A * | 7/1992 | Gilmour et al. | 701/218 |
| 5,438,595 A * | 8/1995 | Cheng et al. | 375/340 |
| 5,559,790 A * | 9/1996 | Yano et al. | 370/342 |
| 5,621,737 A * | 4/1997 | Bucher | 714/704 |
| 5,767,738 A * | 6/1998 | Brown et al. | 329/304 |
| 5,912,822 A * | 6/1999 | Davis et al. | 702/143 |
| 5,940,454 A * | 8/1999 | McNicol et al. | 375/347 |
| 5,987,319 A * | 11/1999 | Hermansson et al. | 455/422.1 |
| 6,075,797 A | 6/2000 | Thomas | 370/468 |
| 6,256,500 B1 * | 7/2001 | Yamashita | 455/441 |
| 6,259,919 B1 * | 7/2001 | Suonvieri et al. | 455/441 |
| 6,307,879 B1 * | 10/2001 | Moriyama | 375/219 |
| 6,330,446 B1 * | 12/2001 | Mori | 455/435.2 |
| 6,370,369 B1 * | 4/2002 | Kraiem et al. | 455/277.1 |
| 6,408,189 B1 * | 6/2002 | Nakamura et al. | 455/504 |
| 6,430,244 B1 * | 8/2002 | Ryu | 375/376 |
| 6,522,696 B1 * | 2/2003 | Mobin et al. | 375/262 |
| 6,531,982 B1 * | 3/2003 | White et al. | 342/357.46 |
| 6,564,042 B1 * | 5/2003 | Jou et al. | 455/238.1 |
| 6,577,695 B1 * | 6/2003 | Everitt et al. | 375/375 |
| 6,618,596 B1 * | 9/2003 | Uchida | 455/522 |
| 6,697,642 B1 * | 2/2004 | Thomas | 455/562.1 |
| 6,700,881 B1 * | 3/2004 | Kong et al. | 370/335 |
| 6,862,457 B1 * | 3/2005 | Sarkar et al. | 455/522 |
| 6,977,912 B1 * | 12/2005 | Porter et al. | 370/329 |
| 7,058,414 B1 * | 6/2006 | Rofheart et al. | 455/456.4 |
| 2001/0041584 A1 * | 11/2001 | Watanabe | 455/553 |
| 2002/0126739 A1 * | 9/2002 | Tiedemann et al. | 375/141 |
| 2004/0258140 A1 * | 12/2004 | Ramberg et al. | 375/148 |
| 2005/0018635 A1 * | 1/2005 | Proctor, Jr. | 370/335 |

\* cited by examiner

*Primary Examiner* — Kevin M Burd

(74) *Attorney, Agent, or Firm* — Volpe and Koenig, P.C.

(57) ABSTRACT

A mobile station measures at least one modulation attribute of at least one signal transmitted across a signaling path of a wireless link between the stations. Because the signal travels on the signaling path between the stations, rapid changes in the modulation attribute can be used to determine both (i) motions of the mobile station and (ii) changes in the base station or mobile station environments. The stations adjust at least one parameter affecting the performance of the wireless link to compensate for the rapid changes.

17 Claims, 10 Drawing Sheets

METHOD AND APPARATUS FOR DETECTING RAPID CHANGES IN SIGNALING PATH ENVIRONMENT

BACKGROUND OF THE INVENTION

Wireless communication systems having a base station and mobile station are susceptible to noise created by motion of the mobile station. Specifically, the motion causes (i) signal delay disturbances and (ii) changes in signal paths (i.e., reflections). In turn, the signal delay and changes in signal paths creates (i) noise and (ii) jitter in receiver timing. The noise and jitter cause errors in data bits of a communication signal between the base station and mobile station, which, in the worst case, manifests itself as a "dropped" connection, familiar to users of mobile phones. In less severe cases of voice communications, the errors in data bits results in static. In less severe cases of data communications, other effects are experienced, such as errors in data transfer between the two stations.

Figure 1:
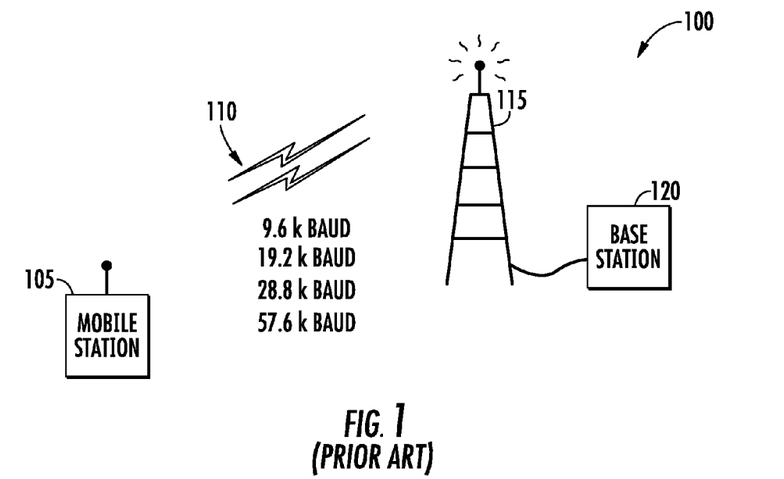
FIG. 1 is a schematic diagram of a portion of a prior art wireless communication system.

FIG. 1 is an illustration of a wireless communication system 100. The wireless communication system 100 includes a mobile station 105 having signaling paths 110 to an antenna 115. The antenna is coupled to a base station 120.

A signaling path 110 is a path along which radio frequency signals are transmitted between the mobile station 105 and antenna 115. The radio frequency signals, in the case of data communications, include data packets transmitting at typical modem baud rates, spanning between 9.6 kBaud and 57.6 kBaud. The maximum baud rate is typically possible where the signaling path 110 is conducive to low noise in the station 105 and/or base station 120. The slowest baud rate may be achievable in cases where the signaling path 110 retards communication between the mobile station 105 and/or base station 120.

In typical data communication applications, the mobile station 105 interacts with a remote web server on the Internet (not shown). The Internet is accessed through the base station 120 to an edge router (not shown). The edge router facilitates data packet transmission across the Internet to the remote web server having the website or files the user of the mobile station 105 wishes to access and/or download. The fastest baud rate, 57.6 kBaud, is desirable for downloading the web page or files from the remote web server.

Mobile computing is an application of data communications susceptible to motion induced noise. For example, a portable computer coupled to the Internet via wireless modem on a railway car experiences motion, but not always. When the railway car is at a railway station, there is no significant movement of the portable computer, so parameters affecting data communications, such as data transfer rate, can be optimized for the highest supported modem baud rate (e.g., 57.6 kBaud). However, when the railway car is moving, the data transfer rate is effectively reduced due to an increase in error rate caused by the motion of the personal computer.

It is well understood in the art that communication protocols, such as TCP/IP, which is a higher layer protocol, trap data transfer errors and request data retransmission of corrupted or noisy data. The amount of data requested for retransmission may be as much as an entire packet, which results in effective data transfer rate reduction analogous to re-reading sentences in a book, which reduces overall reading speed.

One approach to improving data transfer rates in the face of motion of the mobile station is to detect motion of the mobile station and, in turn, reduce the modem baud rate (e.g., 28.8 kBaud) between the base station and mobile station. By reducing the modem baud rate, the data transfer error rate is generally reduced. Although the reduced modem baud rate is less than optimal, the effective data transfer rate may be higher than operating at the faster modem baud rate in the presence of motion causing the high incidence of data retransmissions.

A technique for determining motion of the mobile station is taught in U.S. Pat. No. 6,075,797 by Thomas, entitled "Method and System for Detecting Mobility of a Wireless-Capable Modem to Minimize Data Transfer Rate Renegotiations." In Thomas, the mobile station having a wireless-capable modem detects motion of itself by analyzing the signal-to-noise ratio (SNR) as detected in received data at the wireless-capable modem. Examples of SNR analyses taught by Thomas include (i) statistical analysis of the SNR and (ii) discrete time sampling followed by frequency analysis of the SNR. If the mobile station detects motion, such as (i) by a comparison of a measured SNR sample to a specified SNR mean and variance and (ii) after a sufficient number of deviations from the mean and variance has occurred, the mobile station requests a modem baud rate reduction from the base station. Alternatively, if immobility or stationary status of the mobile station is returned, as determined again by an analysis of the SNR, then the mobile station requests a modem baud rate increase.

SUMMARY OF THE INVENTION

Although the SNR can be an indication of motion of the mobile station and is a measure of a signal of interest, analysis of the SNR for determining motion of the mobile station tends to be suboptimal for certain reasons or in certain situations. For example, in high signal strength areas, there is little variance in the SNR since the limitation is not the thermal noise floor but is instead implementation noise, which results in motion of the mobile station going undetected. Additionally, an automatic gain control circuit in the mobile station receiver may constrain the SNR and, again, cause motion of the mobile station to go undetected.

In general, a mobile station and/or base station employing the principles of the present invention measure(s) at least one modulation attribute of at least one signal transmitted across a signaling path between the mobile station and the base station to determine rapid changes of the modulation attribute(s). Because the signal travels on the signaling path between the mobile station and the base station, rapid changes in the modulation attribute can be used to determine both (i) motions of the mobile station and (ii) changes in the base station or mobile station environments.

In one embodiment of the present invention, a communication system adapts to rapid changes affecting a signaling path in a wireless link by calculating a metric indicative of a rapid change of the signaling path between a base station and a mobile station. The metric is calculated as a function of a modulation attribute of a signal transmitted across the wireless link between the base station and the mobile station. The system adjusts at least one parameter affecting the performance of the wireless link to compensate for the rapid changes affecting the signaling path.

In one embodiment, the mobile station determines the rapid changes; alternatively, the base station can determine the rapid changes. The metric may be indicative of motion of at least one of the stations or may be indicative of an external object affecting the signaling path.

The metric may be computed from a signal in an automatic gain control (AGC) loop in a receiver unit in one of the stations.

Alternatively, the metric may be computed from a phase error signal produced by a delay lock loop, matched filter, or correlator in the receiver unit.

In yet another embodiment, the metric is computed from a frequency error signal in a frequency control loop in the receiver unit.

In any of the embodiments, the metric may be a function of a statistic of the signal(s) from which it is computed. Further, the metric may then be compared to a threshold level before the determination of the rapid change is made.

If either station is equipped with a multi-mode antenna, for example directional and omni-directional, then the antenna is (i) set into directional mode when there are no rapid changes affecting the signaling path and (ii) set into omni-directional mode when there are rapid changes affecting the signaling path. While the antenna is scanning, rapid change detection is optionally disabled to prevent false alarms.

Alternatively, one of the following exemplary data transmission parameters may be adjusted: data transfer rate, power level, FEC (forward error correction) coding rates, modulation attribute of the signal, or antenna characteristic. The modulation attributes include amplitude, frequency, phase, or combination thereof. In one embodiment, at least one of the following is reduced to a minimum level: the data transfer rate, FEC coding rate, or modulation attribute.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

In high speed wireless data communications, there are many causes for noise that reduce effective bandwidth. One such cause is rapid changes (i.e., motion) in the signaling path, where the rapid changes can be caused by motion of one of the computing devices participating in the wireless data communication or an object external from the computing devices but in the signaling path. The rapid changes creates noise and jitter in receiver timing in at least one of the computing devices.

The principles of the present invention provide for detecting the rapid changes in the signaling path in a wireless communication system, including detecting both computing device motion and external object motion in the signaling path. The rapid changes are measured as a function of at least one modulation attribute of a signal transmitted across the wireless link between the stations, such as a mobile station and base station. The signal may be the pilot signal constantly active that serves as a synchronization signal for the mobile station or another signal transmitting between the stations. By using the pilot signal, for example, the signaling path is testing the signaling path of interest directly, which is useful since the signaling path is one of the determining factors in signal-to-noise ratios of the signals on the wireless link.

The measurement of the modulation attribute(s) is made in a manner that eliminates error inherent in using the SNR as a measure of determining rapid changes. For example, SNR metrics, including statistical measurements thereof, suffer sensitivity in high signal strength areas since the signal is implementation-noise limited rather than thermal-noise limited. SNR metrics may also produce erroneous results as a result of automatic gain control (AGC), which improves signal quality over bandwidth of interest.

Thus, the measurements employed by the present invention involve signals from various portions of the communication system, in either the mobile station or base station, that provides a measure of at least one of the modulation attributes. The modulation attributes include amplitude, frequency, phase, or combination thereof. Though there are many ways to determine such metrics, the following exemplary measurement techniques are discussed to serve as a guide to making and using the present invention.

For amplitude, a signal in the AGC loop, such as the AGC control voltage can be measured. For frequency, a signal in the frequency control loop can be measured. For phase, a signal in the phase control loop (e.g., delay lock loop, matched filter or correlator) can be measured.

Based on any of the above listed measurements, a statistical analysis of the respective signal can be performed. For example, the variance provides a good measure as to whether a rapid change in the signaling path has occurred, since the variance is a relative metric. A threshold detector may be employed to compare the metric, variance or other signal, against a previously calculated or measured value to determine that a rapid change in the signaling path has occurred.

In addition to detecting rapid changes, the principles of the present invention support various techniques for adapting to the rapid changes in an effort to maintain high signal-to-noise ratios. For example, a system (i) employing a multi-mode antenna and (ii) using the detection techniques described above, including alternative embodiments thereof, can switch the multi-mode antenna into directive mode when there are no rapid changes detected and can switch the multi-mode antenna into omni-directional mode when there are rapid changes detected. Another example for adapting to the rapid changes is for the mobile station to signal the base station to change the data transfer rate, power level, forward error code (FEC) coding rate, modulation attribute, or antenna characteristic after determining that rapid changes in the signaling path are occurring.

By actively monitoring and adapting to rapid changes in one of the exemplary manners just described, the data transfer rate is improved or maximized for the wireless data communication environment, since fewer retransmissions of data packets should be necessary following the adaptive measure taken. Retransmissions, as well understood in the art, cause effective loss of data transfer rate. Thus, in an application such as downloading websites or files from web servers on the Internet, the data transfer rates can achieve sufficient speed (e.g., 57 kBaud) to make the user's experience efficient and enjoyable.

Figure 2A:
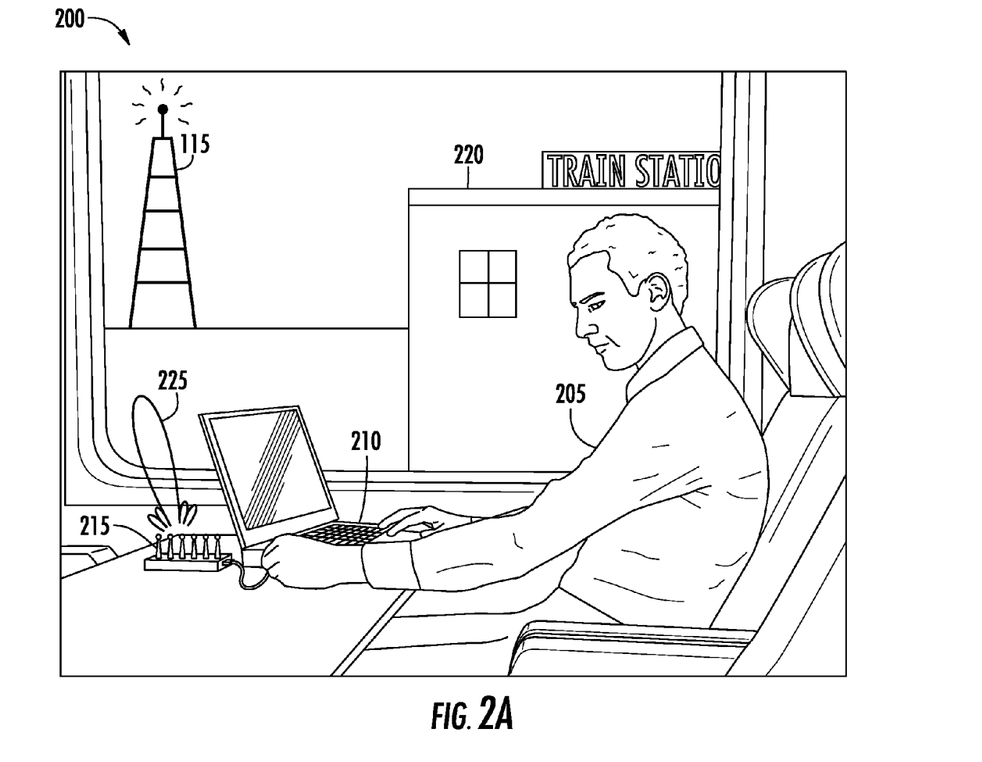
FIG. 2A is a graphical diagram of a person on a stationary train using a mobile station (e.g., personal computer) coupled to the wireless network of FIG. 1 via a scanning antenna operating in directional mode for receiving signals on a signaling path in the communication link.

FIG. 2A is an illustration of a user 205 using a personal computer 210 on a train stopped at a train station 220. The personal computer 210 employs a scanning antenna 215 and an embodiment of the present invention. The scanning antenna 215 radiates/receives radio-frequency signals (RF) that are received/radiated by an antenna on an antenna tower 115 that is coupled to a base station 120.

Because the train 200 is stopped at the train station 220, the mobile station (i.e., personal computer 210 and scanning antenna 215) can operate in a directive mode, as indicated by the directive antenna lobe 225. Directive mode improves antenna gain, which improves the signal-to-noise ratio for the system, ultimately resulting in improved data transmission efficiency.

The reason the mobile station can operate in directive mode while the train is stopped at the train station is because the lack of train motion allows the directive antenna lobe 225 to remain constantly pointed at the antenna tower 115. The mobile station, using the principles of the present invention, determines that the mobile station is stationary, and, in turn, sets the scanning antenna 215 into directive mode.

Additionally, the mobile station can also determine whether there are any rapid changes in the signaling path, between the mobile station and the antenna tower 115, by calculating a metric indicative of a changing environment between the mobile station and base station as a function of a change in at least one modulation attribute of a signal transmitting across the wireless connection between the mobile station and the base station.

Figure 2B:
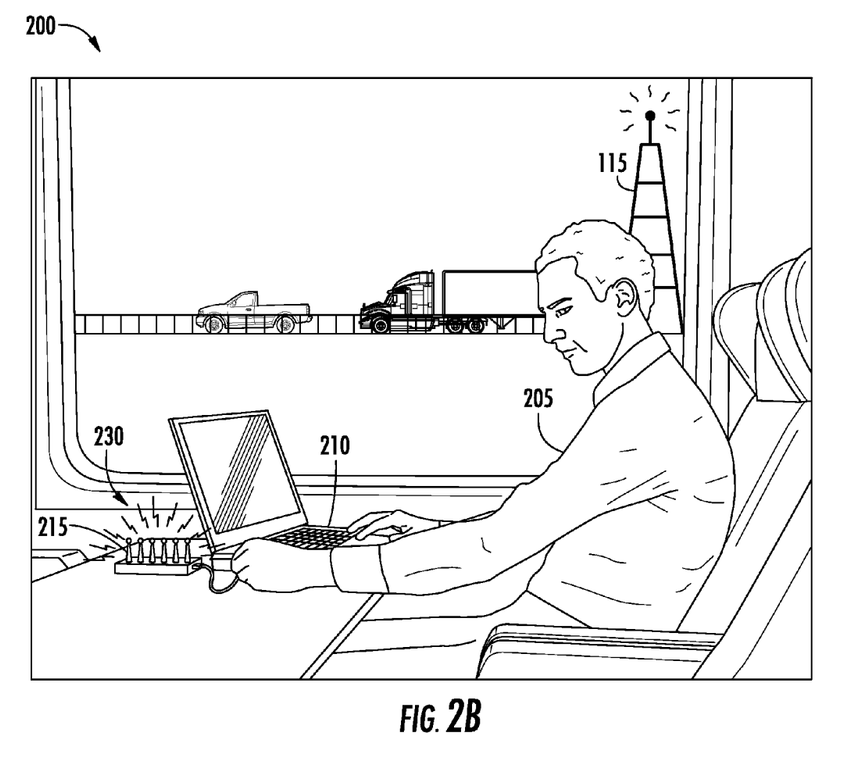
FIG. 2B is a graphical diagram of the person of FIG. 2A on the now moving train with the scanning antenna now operating in omni-directional mode.

Alternatively, the base station 120 determines that the signaling path between the base station and FIG. 2B is an illustration of the train 200 now moving. The user 205 is still using the personal computer 210 coupled to the scanning antenna 215. The scanning antenna 215 is still communicating to the antenna tower 115. However, the scanning antenna 215 is set in omni-directional mode by on the personal computer 210. Omni-directional mode is indicated by the omni-directional RF signals 230.

The reason that the scanning antenna 215 is set into omni-directional mode is because the mobile station has now determined, through the use of an embodiment of the present invention, that rapid changes are affecting the signaling path between the scanning antenna 215 and the antenna on the antenna tower 115 receiving the signals for the base station 120. Omni-directional mode reduces data transmission errors caused by using the scanning antenna 215 in directive mode when the mobile station is moving since the directive antenna lobe 225 (FIG. 2A) will not constantly point directly at the antenna tower 115 as a result of the motion. So, by putting the scanning antenna 215 into omni-directional mode, a more constant antenna gain is achieved. Thus, in a data communication protocol such as TCP/IP, there are fewer data retransmissions caused by data transmission errors, and, as a result, a higher data rate transmission between the base station and the mobile station is achieved.

Figure 3:
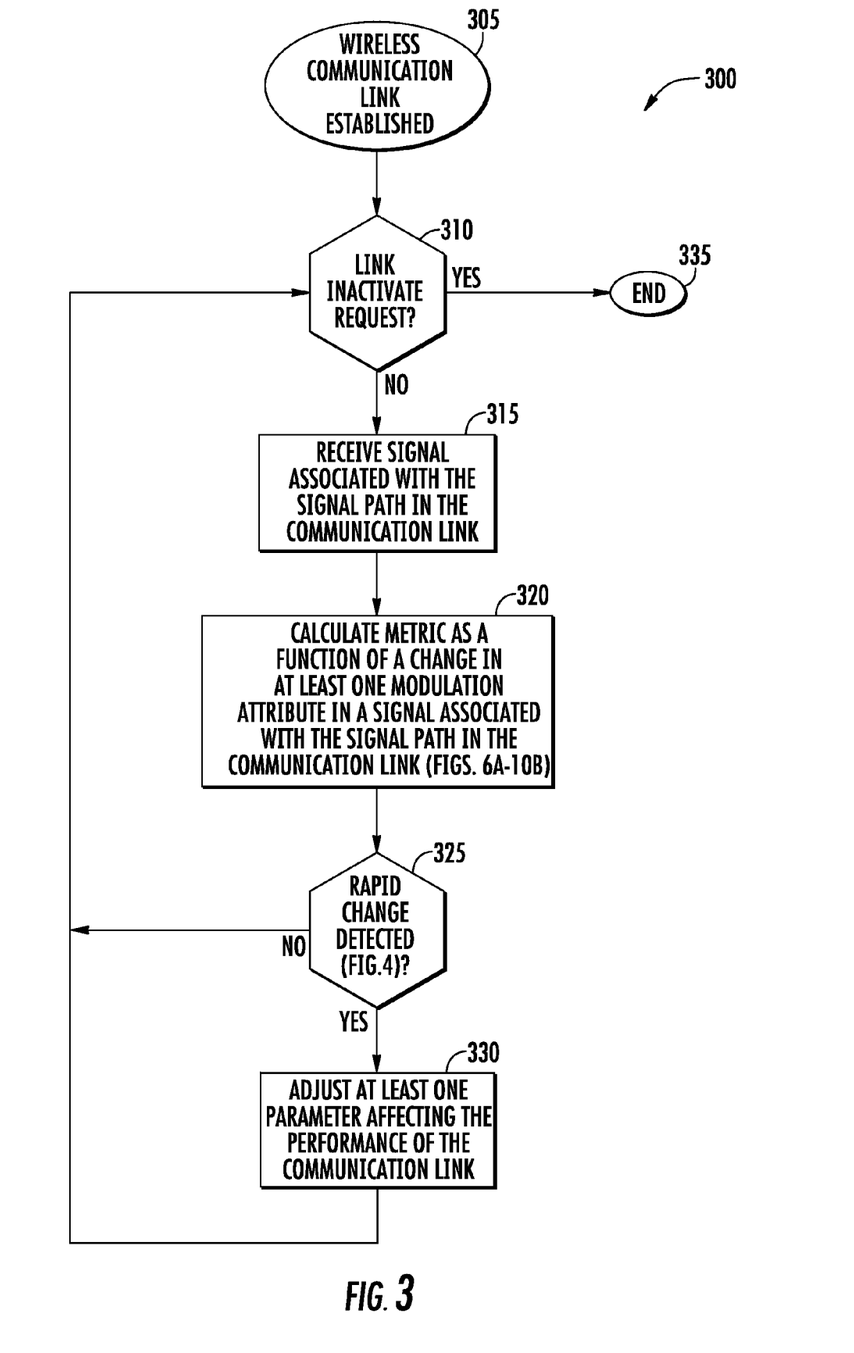
FIG. 3 is a flow diagram of an embodiment of a generalized process employed by the mobile station of FIGS. 2A and 2B.

FIG. 3 is an embodiment of a process 300 for adapting to rapid changes affecting the signaling path between the base station 120 and mobile station 105. For purposes of this discussion, it is assumed that a processor in the mobile station 105 executes the process 300. It should be understood that this process 300 is generic and can be exercised in the base station 120 (FIG. 2A).

The process 300 begins in step 305 once the wireless communication link has been established. In step 310, a determination is made as to whether a link_inactivate request has been made. If a link_inactivate request has not been made, then, in step 315, the mobile station receives a signal associated with the signaling path in the communication link.

In step 320, the mobile station calculates a metric as a function of a change in at least one modulation attribute in a signal associated with the signaling path in the communication link. Instead, the present invention uses, in one embodiment, a signal in the AGC loop. As shown, a statistical processing unit 628 processes the AGC voltage to determine an amplitude variance 650. Examples of circuits employed, by various embodiments of the present invention, to calculate this metric are shown in FIGS. 6A-10B, and described below following the description of the process through FIG. 5.

Following the calculation of the metric in step 320, the process 300 makes a determination in step 325 as to whether a rapid change in the signaling path has been detected between the base station 120 and the mobile station 105. A rapid_change_detection module is executed in step 325 to make the determination as to whether a rapid change in the signaling path has been detected is shown in detail in FIG. 4.

Figure 4:
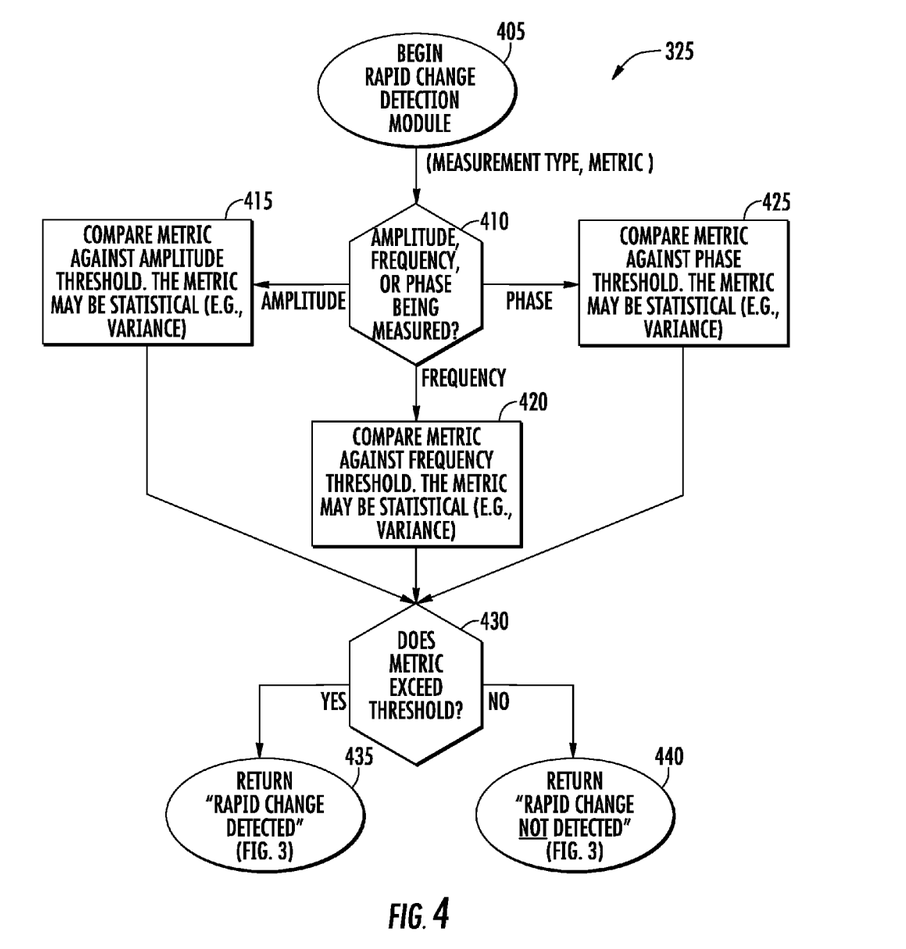
FIG. 4 is a flow diagram of an embodiment of a module of FIG. 3 used to detect rapid changes in the signaling path between the mobile station of FIGS. 2A and 2B and a base station.

FIG. 4 is a flow diagram of an embodiment of a process of the rapid_change_detection module 325. The module begins in step 405. The parameters, "measurement_type" and "metric" are typically provided to the rapid_change_detection module 325. The value of the measurement_type parameter indicates to the rapid_change_detection module 325 the type of measurement being made, where the measurement includes at least one modulation attribute of the signal transmitted across the wireless link between the mobile station 105 and the base station 120. The modulation attribute(s) include amplitude, frequency, or phase.

The value of the "metric" parameter is a function of a change in at least one of the modulation attributes.

In step 410, the module 325 determines whether the measurement type is amplitude, frequency, or phase. A case in which more than one modulation attribute is used for this process is not shown but should be understood from the teachings herein described.

If the measurement type is "amplitude", then the process of module 325 continues in step 415. In step 415, the module 325 compares the amplitude metric received against a predetermined amplitude threshold. Both the amplitude metric and the amplitude threshold may be statistical. An example of a statistical measure is variance, which provides a relative measure of motion, accurate motion sensing information, good sensitivity, and few false alarms.

If the measurement type is "frequency", then the process of module 325 executes step 420. In step 420, the process of module 325 compares the frequency metric against a frequency threshold, which is predetermined. As in the case of amplitude measurements, the frequency threshold and frequency metric may be statistical (e.g., variance).

If the measurement type is "phase", then the module 325 executes step 425. In step 425, the process of module 325 compares the phase metric against a phase threshold, which is predetermined. As in the case of amplitude and frequency measurements, the phase threshold and phase metric may be statistical (e.g., variance).

Following the comparisons of step 415, step 420, or step 425, the process of module 325 continues to step 430. In step 430, the process determines whether the metric exceeds the threshold. If the metric does exceed the threshold, then the process continues in step 435, where a "rapid change detected" flag is reported back to the process 300 of FIG. 3. If the process determines that the metric does not exceed the threshold, then the process continues in step 440, where a "rapid change not detected" flag is returned to the process 300 in FIG. 3.

Referring again to FIG. 3, the process 300 continues based on the flag returned from step 325, as just described. If a rapid change has not been detected, then the process continues in step 310 with determining whether a link_inactivate request has been sent. Otherwise, if a rapid change has been detected, then the process 300 continues in step 330. In step 330, the process 300 adjusts at least one parameter affecting the performance of the communication link. Step 330 is expanded upon in FIG. 5, and implemented as an adjust_parameter routine.

Figure 5:
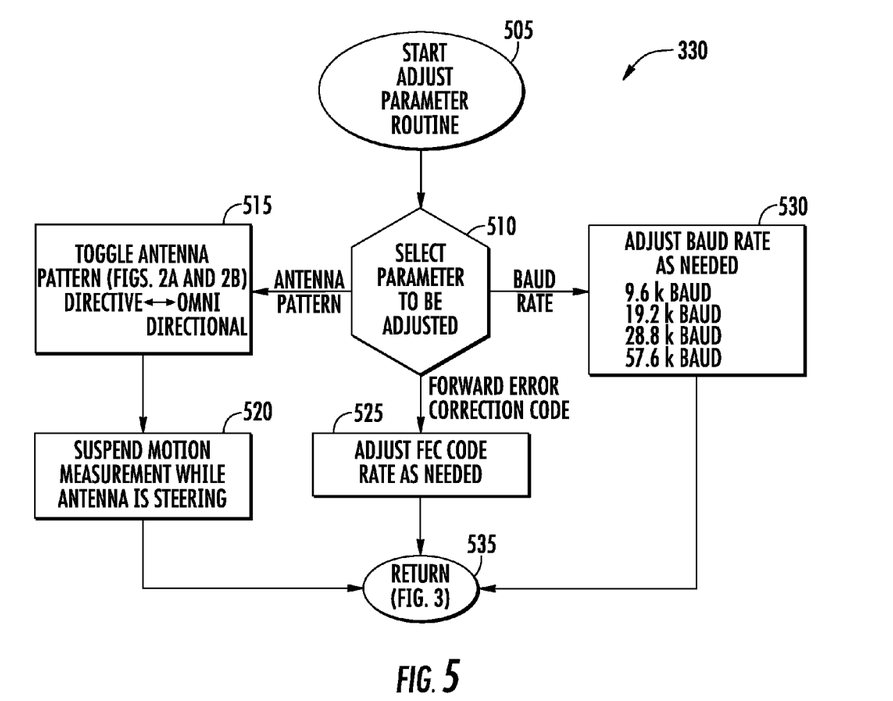
FIG. 5 is a flow diagram of an embodiment of a module of FIG. 3 used to adjust parameters in the communication signal or antenna.

The process of the adjust_parameter routine 330 begins in step 505. After step 505, the process makes a determination as to which parameter is to be adjusted in step 510. If the antenna pattern is to be adjusted, then, in step 515, the antenna pattern is toggled, for example, between the modes "directive" and "omnidirectional", (FIGS. 2A and 2B).

After toggling the antenna pattern in step 515, in step 520, the process 330 suspends motion measurements (i.e., rapid change detection) while the antenna is steering.

If the parameter to be adjusted is the forward error correction (FEC) coding rate, then, following step 510, the FEC coding rate is adjusted, as needed, in step 525.

If the parameter to be adjusted is the baud rate, then, following step 510, the process 330 continues in step 530, where the baud rate is adjusted, as needed. Typical baud rates span from 9.6 kBaud through 57.6 kBaud, which are typical modem communication rates.

In other embodiments, at least one of the following is reduced to a minimum level: data transfer rate, FEC coding rate, or modulation attribute. For example, in a quadrature amplitude modulation (QAM) system, symbols can be reduced from sixty-four symbols, for example, to two. In this case, the QAM system is reduced to a phase shift keying (PSK) system, which is expected to operate with fewer data transmission errors since the binary symbols are typically easily detectable in the presence of noise.

Following steps 520, 525, and 530, the process 330 returns, in step 535, to the process 300 (FIG. 3). It should be understood that the parameters that can be adjusted (i.e., the antenna pattern, FEC coding rate, and baud rate) are exemplary of the parameters that can be adjusted to improve data transfer and is not intended to be inclusive of all possible parameters that can be adjusted by the communication system between the base station 120 and the mobile station 105.

Referring again to FIG. 3, following step 330, the process 300 continues at step 310 to determine whether a link_inactivate request has been received. If a link_inactivate request has been received, then the process 300 ends in step 335.

Figure 6A:
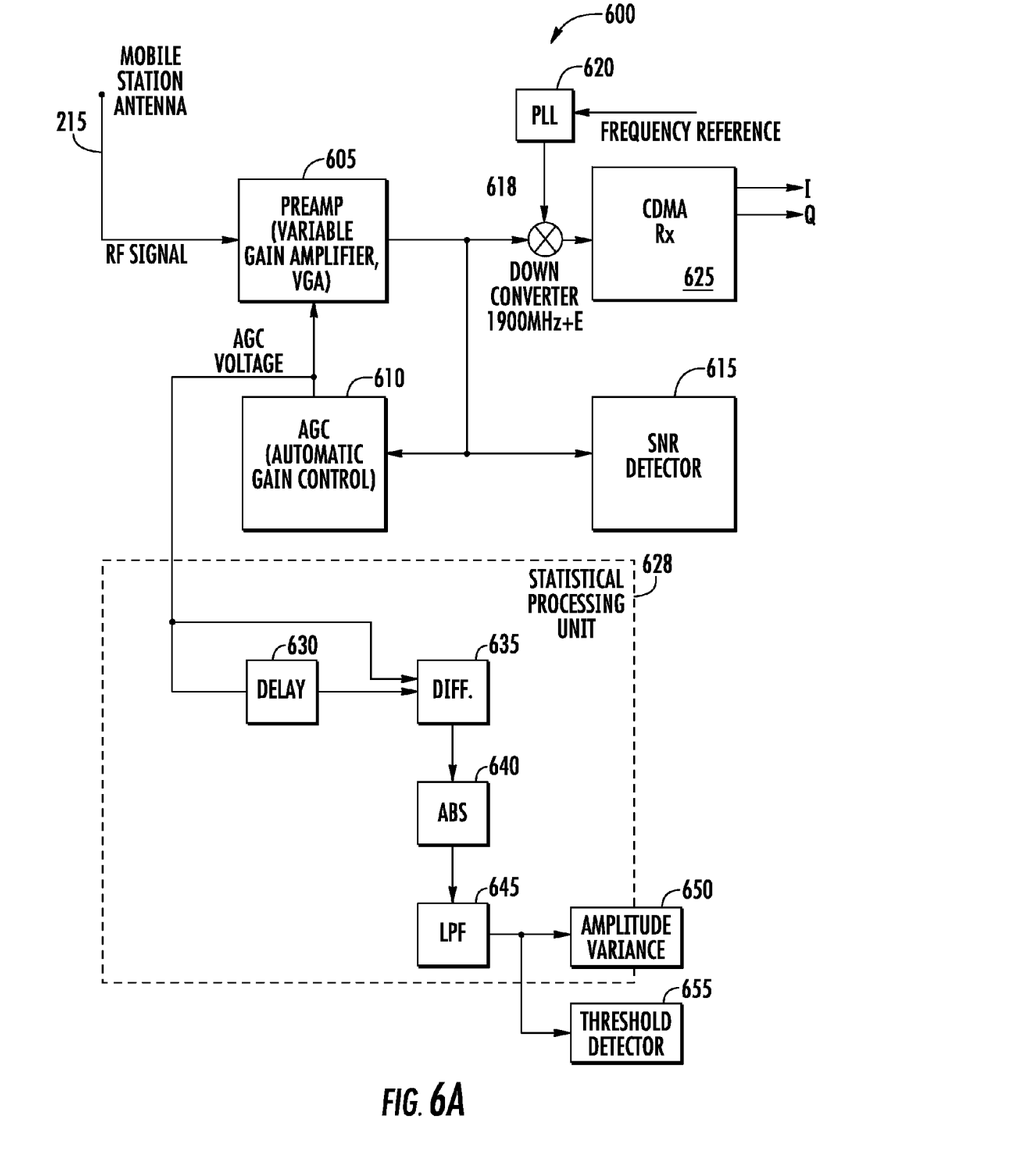
FIG. 6A is a block diagram of a receiver in the mobile station of FIGS. 2A and 2B in which an AGC module signal output is used to determine a metric for sensing rapid changes in the amplitude of a communication signal traveling on the signaling path of the communication link.
Figure 6B:
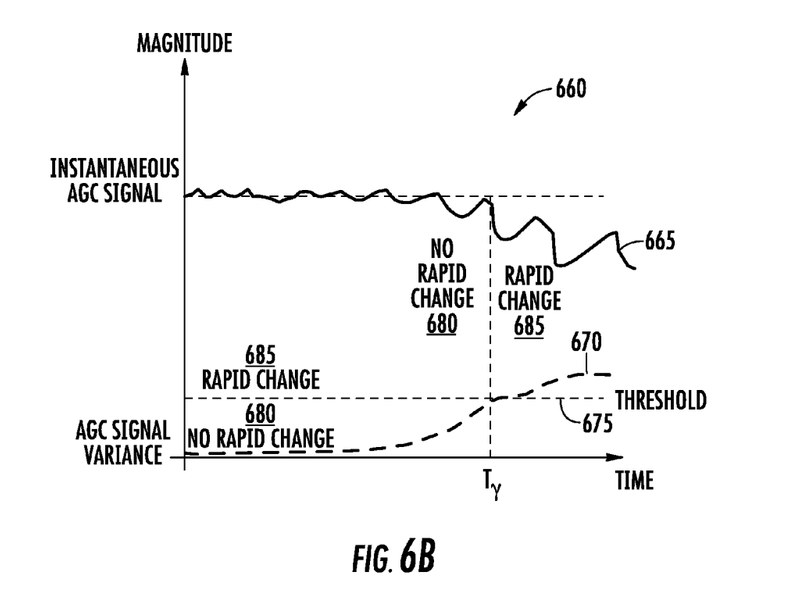
FIG. 6B is a plot of the AGC voltage of FIG. 6A.
Figure 7:
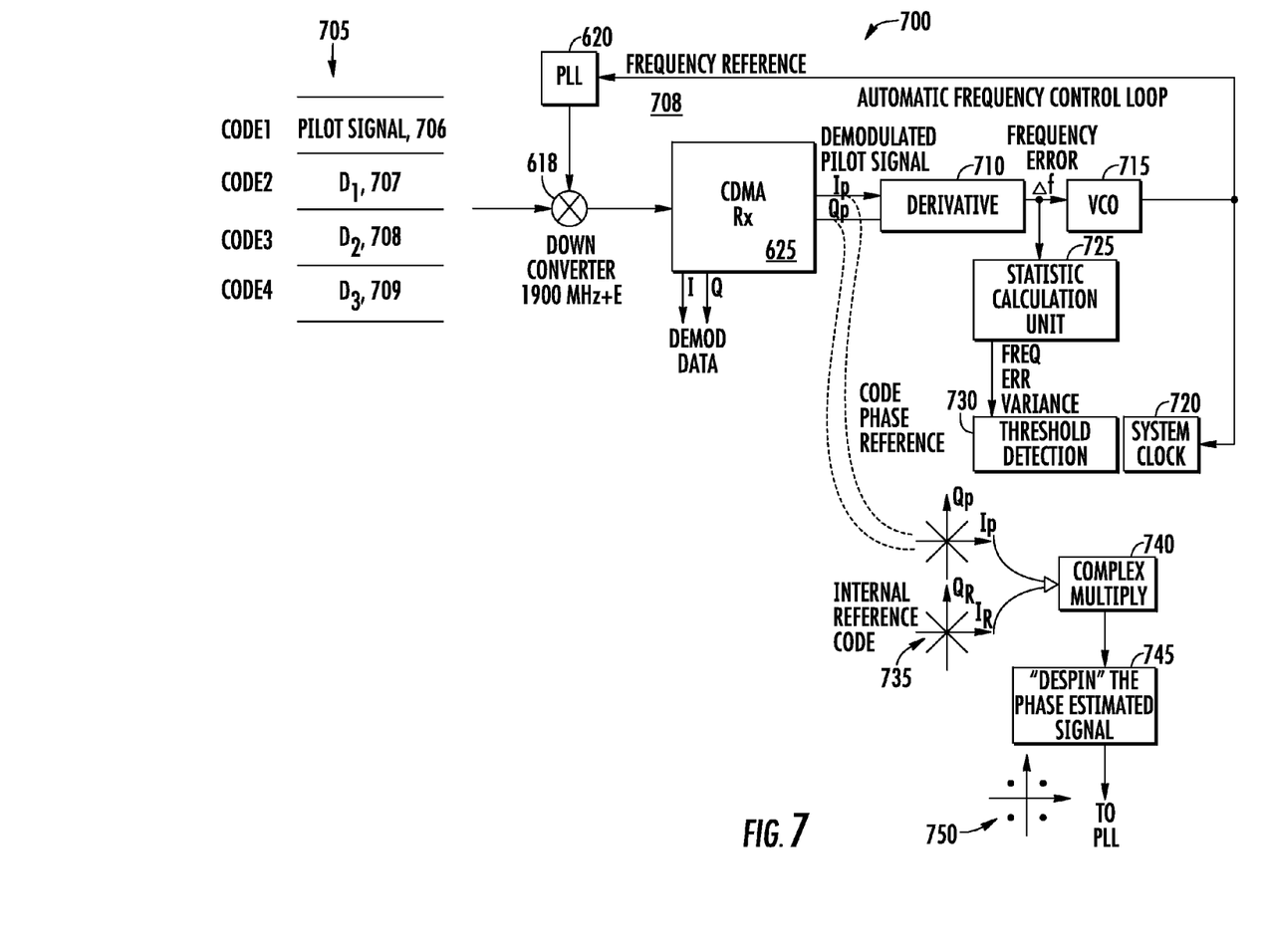
FIG. 7 is a block diagram of a frequency lock loop in a signal providing a metric corresponding to a rapid change in frequency, doppler shift variance, or phase used as an alternative to the amplitude signal of FIG. 6A.

The following figures, FIG. 6A-10B illustrate the various exemplary techniques by which changes in the modulation attributes of the signal transmitted across the wireless link can be observed. Specifically, FIGS. 6A-6B illustrate detection of changes in the amplitude modulation attribute. FIG. 7 illustrates detection of the frequency modulation attribute. FIGS. 8-10B illustrate detection of the phase modulation attribute. It should be noted that most of the circuits and structures employed for detecting the changes in the modulation attributes are common in wireless computing/communication devices.

FIG. 6A is a block diagram of an exemplary receiver circuit 600 in a wireless modem in, for example, a mobile station 105 or base station 120. In the case of a mobile station 105, the mobile station includes an antenna 215 to receive an RF signal over the wireless communication link across the signaling path 110 from the antenna station 115 coupled to the base station 120. The RF signal is received by a pre-amplifier 605, which, in this case, is a variable gain amplifier (VGA). The output of the pre-amplifier 605 is sent to a down-converter 618, AGC controller 610, and SNR detector 615.

The down-converter 618 demodulates the output from the pre-amplifier 605 with a signal from a phase locked loop (PLL) controller 620. The down-converter 618 outputs a frequency demodulated signal, thereby providing symbols to a CDMA receiver 625. The CDMA receiver 625 outputs typical in-phase and quadrature (I, Q) signals for further CDMA processing.

The SNR detector 615 calculates the signal-to-noise ratio of the output of the preamplifier 605. The output from the SNR detector 615 may be used, for among other reasons, to detect motion of a mobile station, as taught in U.S. Pat. No. 6,075,797 by Thomas, as discussed above. However, the present invention does not use the results from the SNR detector 615 for reasons also discussed above, including the fact that the SNR detector 615 receives the output from the pre-amplifier 605 that has been normalized as a result of the feedback from the AGC 610.

Instead, the present invention uses a signal (e.g., AGC voltage) that indicates a rapid change in a modulation attribute, which in this case is amplitude modulation. And, since a rapid change in the modulation attribute typically varies in a manner related to a rapid change in the signaling path, the detection is accurate and repeatable.

Continuing to refer to FIG. 6A, a statistical processing unit 628 uses a difference computational unit 635 to calculate a difference between the AGC voltage and a delayed representation of the AGC voltage, as produced by a delay unit 630. The difference computational unit 635 provides an output to an absolute value computational unit 640, which rectifies the output of the difference computational unit 635. The output from the absolute value computational unit 640 is then processed by a low pass filter (LPF) 645 to produce an amplitude variance 650. The statistical processing unit 628 can also use other techniques not shown but known in the art for calculating the variance.

The amplitude variance 650 may also be compared against a threshold by a threshold detector 655.

Thus, the amplitude variance 650 or result from the threshold detector 605 may be reported by step 320 in the process 300 (FIG. 3).

It should be understood that the statistical processing unit 628 can also be employed to provide alternative metrics regarding the amplitude modulation attribute of the signal transmitted across the wireless link.

FIG. 6B is a plot of the instantaneous AGC signal output from the AGC 610 (FIG. 6A). As shown, the instantaneous AGC signal 665 shows no indication of rapid changes in the signaling path between the mobile station 105 and the base station 120. However, after time $T_v$, the instantaneous AGC signal 665 shows an indication that rapid changes are taking place between the mobile station 105 and the base station 120. Accordingly, a no_rapid_change zone 680 and a rapid_change zone 685 are indicated to show the point at which the instantaneous AGC signal 665 indicates that a rapid change has occurred.

As expected, the AGC signal variance 670 increases as the instantaneous AGC signal 665 shows indications of rapid changes of the signaling path between the mobile station 105 and the base station 120. As should be understood, the AGC signal variance 670 corresponds with the amplitude variance 650 computed by the statistical processing unit of FIG. 6A. And, as expected, the AGC signal variance 670 crosses the threshold 675 at time $T_v$, indicating that a rapid change has been detected.

The threshold is pre-determined through either standard probability calculations or through emperical measurements and applied here. Similar to the instantaneous AGC signal 665, the AGC signal variance 670 has a no_rapid_change zone 680 and a rapid_change zone 685, below and above the threshold 675, respectively.

FIG. 7 is a schematic diagram of an example of a typical automatic frequency control circuit 700 in a receiver portion of a wireless modem used by the mobile station 105 and base station 120. CDMA codes 705 include a pilot signal 706 and data signals 707-709. The CDMA codes 705 are amplitude compensated by the pre-amplifier 605 (FIG. 6A) in the AGC loop. The CDMA codes 705 are down-converted by a down-converter 618, which demodulates the high frequency signals to a slower signal rate. The CDMA receiver 625 provides demodulated (I, Q) signals for further processing.

The present invention can take advantage of the phase offset of the symbols, such as the demodulated pilot signal output by the CDMA receiver 625, for determining rapid changes in the phase modulation attribute. The demodulated pilot signal $(I_p, Q_p)$ is multiplied by an internal reference code $(I_r, Q_r)$ 735 by a complex multiplier 740. The output from the complex multiplier is used to "de-spin" the phase estimated signal by a de-spin module 745. A four-point constellation 750 is output by the de-spin module 745 and sent to a phase-locked loop. A signal representing the amount of phase shift needed to "de-spin" the phase estimated signal is used by a statistical calculation unit to determine the level of rapid changes affecting the signaling path, as described in FIG. 6A.

Continuing to refer to FIG. 7, as an alternative to using phase from the de-spin module 745 to determine a metric of the rapid changes affecting the signaling path, a metric relating to the frequency error can also be calculated using a signal in the automatic frequency control loop. Because the frequency error is directly related to doppler shift, which is a relative metric, the metric relating to the frequency error can be the value of the frequency error signal itself. The signal of interest is found after taking a derivative of the demodulated pilot signal, $(I_p, Q_p)$, by a derivative calculation unit 710.

The output from the derivative calculation unit 710 is a frequency error, $\Delta f$. The frequency error is received by a voltage controlled oscillator (VCO) 715. The output from the VCO 715 is a representation of the frequency error, which is fed back to adjust a system clock 720 and also fed to a PLL controller 620. The output from the PLL controller 620 is presented to the down-converter 618, which closes the automatic frequency control loop.

Inside the automatic frequency control loop 708, the output from VCO 715 is used as a signal from which a metric can be computed to determine a rapid change affecting the signaling path. The computations are made similar to the computations made to the AGC voltage as described in reference to FIG. 6A.

In an alternative embodiment of the present invention, the frequency error signal in the automatic frequency control loop 708 is used to determine whether rapid changes are affecting the signaling path between the mobile station 105 and the base station 120. As shown, the statistic calculation unit 725 calculates a variance of the frequency error. The variance of the frequency error is passed to a threshold detector 730, which is used to determine whether the rapid changes affecting the signaling path rise to the level of taking action to adapt to the rapid changes, as shown and described in reference to FIG. 3.

Attention now turns now to circuit implementations that provide information relating to rapid changes in phase modulation attributes.

Figure 8:
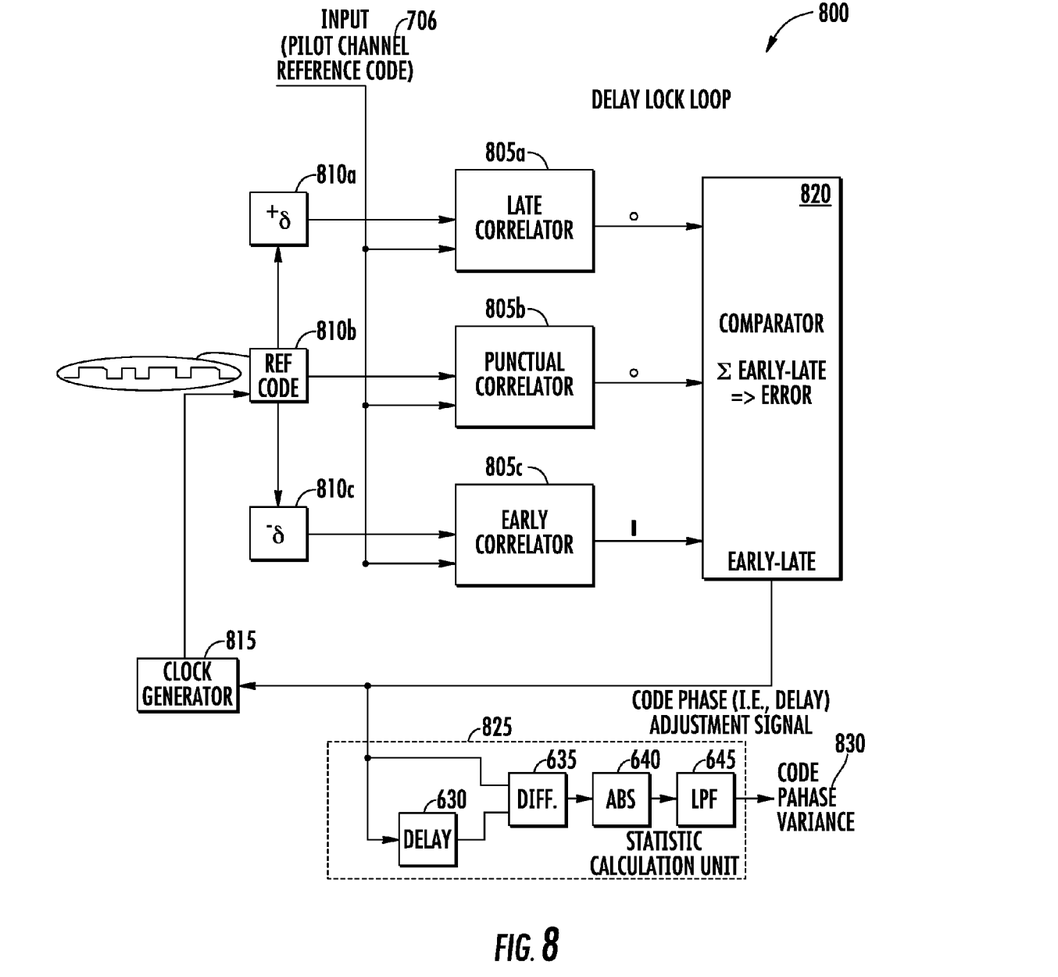
FIG. 8 is a block diagram of a delay lock loop providing a phase signal used as an alternative to the amplitude signal of FIG. 6A.

FIG. 8 is a schematic diagram of a delay lock loop 800 that produces a signal that indicates phase disturbance related to rapid changes affecting the signaling path between the mobile station 105 and the base station 120. The delay lock loop 800 receives an input 706, such as a pilot channel reference code signal. The delay locked loop 800 includes correlators to detect whether the input 706 is late, punctual, or early with respect to an internally generated reference code signal. The correlators include late correlator 805a, punctual correlator 805b, and early correlator 805c (collectively 805).

The late correlator 805a receives the input 706 and the internally generated reference code plus a delta from phase shifter 810a. The punctual correlator 805b receives the input 706 and the internally generated reference code without phase shift from the reference code generator 810b. The early correlator 805c receives the input 706 and the internally generated reference code minus a delta from phase shifter 810c.

Each of the correlators, 805a, 805b, 805c produces a respective binary output that indicates the alignment of their two respective input signals. As shown, the early correlator 805c detects and indicates that the internally generated reference code is earlier in phase than the input signal 706, as indicated by the binary '1' output. The output from the correlators 805 are received by a comparator 820.

The comparator 820 analyzes the results from the correlators 805 and, in turn, produces an error signal (e.g., early minus late), which is a code phase (i.e., delay) adjustment signal that is fed back to a clock generator 815. The output from the clock generator 815 is used to generate the reference code by the reference code generator 810b. Thus, by adjusting the phase of the clock signal, the phase of the reference code is also adjusted The code phase adjustment signal is used by this embodiment of the present invention to provide a metric indicating rapid changes in the signaling path. In this case, a statistic calculation unit 825 calculates a code phase variance 830, similar to the amplitude variance calculated in FIG. 6A. The code phase variance 830 may be compared to a threshold by a threshold detector (not shown) and used in a manner set forth above by the process 300 (FIG. 3) to determine whether a rapid change has been detected in step 325 (FIG. 3).

Figures 9A, 9B:
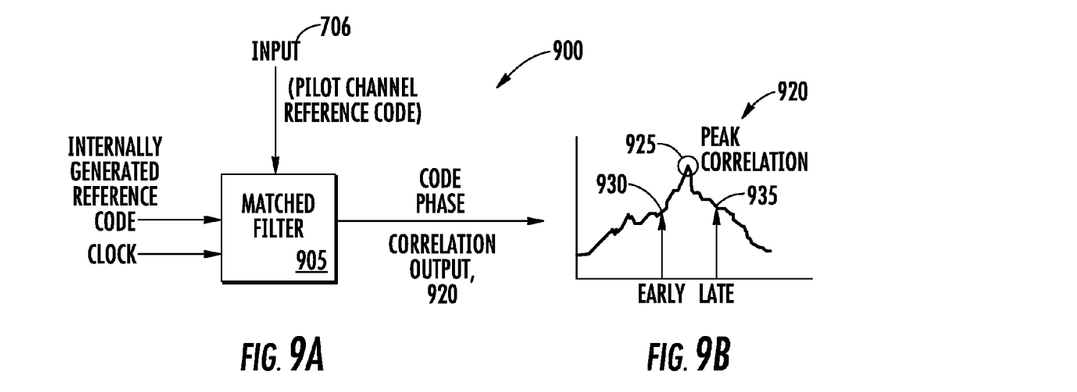
FIG. 9A is a block diagram of a matched filter providing a phase signal used as an alternative to the delay lock loop of FIG. 8.
FIG. 9B is a chart of the correlation output from the matched filter of FIG. 9A.

FIG. 9A illustrates an alternative technique for assessing the phase modulation attribute to determine rapid changes affecting the signaling path. In this embodiment, a matched filter 905 is employed to compare the input signal 706 (e.g., pilot channel reference code) to an internally generated reference code. The matched filter 905 outputs a code phase correlation output, which is seen in FIG. 9B.

FIG. 9B is a plot of the code phase correlation output 920 produced by the matched filter 905 (FIG. 9A). The code phase correlation output 920 has a peak 925. Early and late detectors (not shown) are set a pre-determined distance apart from the expected peak correlation 925 to measure the code phase correlation output 920. Based on the magnitudes measured by the early and late detectors, the phase of the internally generated reference code provided to the matched filter 905 can be adjusted, in a manner similar to the adjustment made to the clock generator 815 in FIG. 8.

Thus, the code phase adjustment determined as a function of the magnitudes detected by the early and late detectors (not shown) can be processed by a statistical processing unit, as previously discussed in FIGS. 6A, 7, and 8. In one embodiment, the variance of the code phase is provided as a statistical metric. Further, the variance can be compared to a threshold by a threshold detector, as also previously discussed.

Figure 10A:
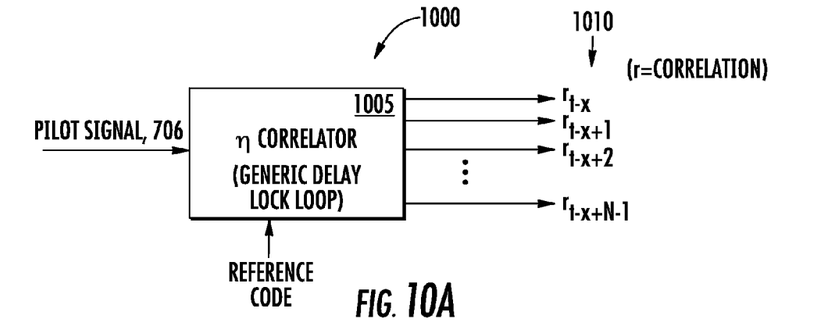
FIG. 10A is a block diagram a correlator providing a phase signal used as an alternative to the delay lock loop of FIG. 8.

FIG. 10A is an embodiment of yet another technique for using the code phase to determine a metric relating to rapid changes affecting the signaling path. A correlator 1005, which is a generic delay locked loop, compares the pilot signal 706 to an internally generated reference code. The output from the correlator 1005 is a series of correlations 1010. The correlations 1010 are plotted in FIG. 10B to provide a visual image of how rapid changes in phase are determined using this technique.

Figure 10B:
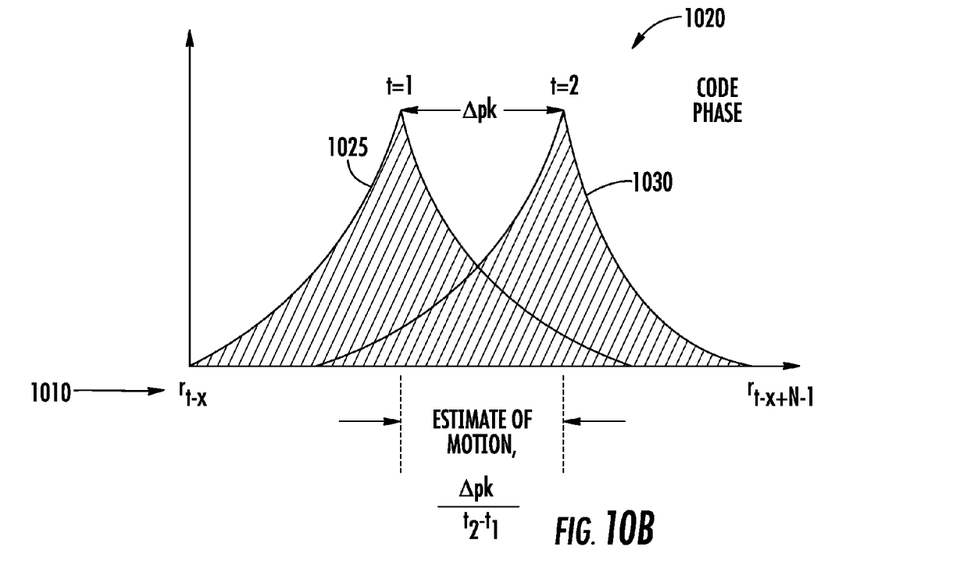
FIG. 10B is a plot of the correlation output of the correlator of FIG. 10A.

FIG. 10B is a plot of the correlations 1010 that graphically illustrates the correlation between the pilot signal 706 and the internally generated reference code and the resulting relationship to rapid changes in the signaling path between the mobile station and the base station. A first correlation curve 1025 of the code phase indicates the correlation between the pilot signal 706 and the internally generated reference code at t=1. A second correlation curve 1030 indicates the correlation at t=2. Correlation curves can be plotted for further time instants. The difference in time between the peaks of the curves 1025, 1030, etc. provides an estimate of rapid changes (e.g., motion of the mobile station) affecting the signaling path.

In this embodiment, differences in the peaks in time are used to calculate a variance, as previously discussed, and compared to a threshold, as also previously discussed. The metric or result from the comparison is then used to adjust at least one parameter affecting the performance of the wireless link to compensate for the rapid changes affecting the signaling path.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for adapting to rapid changes affecting a wireless signal of a wireless communication link between a first station and a second station, the method comprising:
   receiving, by the first station, a measurement of amplitude variance of the wireless signal;
   determining, by the first station, a rapid change in the wireless signal by comparing the measurement to a predetermined threshold;
   selecting, by the first station, a parameter adjustment from a plurality of parameters related to the wireless signal, based on the determined rapid change; and
   performing, by the first station, the parameter adjustment.

2. The method as in claim 1, wherein the first station is a mobile station.

3. The method as in claim 1, wherein the determining is based on a signal in an automatic gain control (AGC) loop.

4. The method as in claim 3, wherein the determining is a function of a variance of the signal in the AGC loop.

5. The method as in claim 1, wherein the selecting the parameter adjustment includes selecting an antenna mode, which comprises changing from directive to omni-directional.

6. The method as in claim 1, wherein the selecting the parameter adjustment includes selecting an antenna mode, which comprises changing from omni-directional to directive.

7. The method as in claim 1, wherein the selecting the parameter adjustment includes selecting to reduce at least one of forward error correction (FEC) coding rate, or the number of modulation symbols, to a minimum level while maintaining the signal path.

8. The method of claim 1 wherein the determined rapid change is attributable to motion of a communication device associated with a signal path over which the wireless signal is transmitted or motion of an external object in the signal path.

9. A station configured for adapting to rapid changes affecting a wireless signal of a wireless communication link between a first station and a second station, the station comprising:
   a processing unit configured to receive a measurement of amplitude variance of the wireless signal and to determine a rapid change in the wireless signal by comparing the measurement to a predetermined threshold; and
   a compensator configured to perform a signaling parameter adjustment from a plurality of parameters related to the wireless signal, responsive to the rapid change determined by the processing unit.

10. The station as in claim 9, configured as a mobile station.

11. The station as in claim 9, wherein the processing unit is configured to determine the measurement based on a signal in an automatic gain control (AGC) loop.

12. The station as in claim 11, wherein the processing unit is configured to determine the measurement as a function of a variance of the signal in the AGC loop.

13. The station as in claim 9, further comprising:
   an antenna having a changeable antenna mode, wherein the compensator is configured to change an antenna mode.

14. The station as in claim 13, wherein the compensator is configured to change an antenna mode between directive and omni-directional modes.

15. The station as in claim 9, wherein the compensator is configured to reduce at least one of forward error correction (FEC) coding rate, or the number of modulation symbols, to a minimum level while maintaining the signal path.

16. The station of claim 9 wherein the determined rapid change is attributable to motion of a communication device associated with a signal path over which the wireless signal is transmitted or motion of an external object in the signal path.

17. A non-transitory computer-readable storage medium containing a set of instructions for a general purpose computer, the set of instructions comprising:
- a signal adaptation code segment configured to cause a processor to control a signaling path to adapt to rapid changes affecting the signaling path after receiving a measurement of amplitude variance of a wireless signal of a wireless communication link between a first station and a second station;
- a detection code segment configured to determine a rapid change in the wireless signal by comparing the measurement to a predetermined threshold; and
- an adjusting code segment configured to perform a signaling parameter adjustment from a plurality of parameters related to the wireless signal, responsive to the rapid change determined by the detecting code segment.

\* \* \* \* \*